(12) United States Patent
Tang (10) Patent No.: US 7,024,438 B2
(45) Date of Patent: Apr. 4, 2006

(54) METHOD OF GENERATING POSITIVE INTEGER NUMBER IN HEBREW NUMBER SYSTEM

(75) Inventor: Frank Yung-Fong Tang, San Jose, CA (US)

(73) Assignee: America Online, Inc., Dulles, VA (US)

(*) Notice: Subject to any disclaimer, the term of this patent is extended or adjusted under 35 U.S.C. 154(b) by 770 days.

(21) Appl. No.: 09/922,317

(22) Filed: Aug. 2, 2001

(65) Prior Publication Data

US 2003/0037078 A1    Feb. 20, 2003

(51) Int. Cl.
*G06F 7/00*    (2006.01)
(52) U.S. Cl. .................................... 708/204
(58) Field of Classification Search ............... 708/204; 704/2
See application file for complete search history.

(56) References Cited

U.S. PATENT DOCUMENTS

| | | | | |
|---|---|---|---|---|
| 2002/0143825 A1* | 10/2002 | Feinberg | ............. | 707/526 |
| 2004/0198471 A1* | 10/2004 | Deeds | ............. | 455/575.1 |
| 2004/0215647 A1* | 10/2004 | Farn et al. | ............. | 707/101 |

* cited by examiner

*Primary Examiner*—Tan V. Mai
(74) *Attorney, Agent, or Firm*—Michael A. Glenn; Glenn Patent Group

(57) ABSTRACT

A method for generating a corresponding Hebrew character representation for a positive integer number and a Hebrew number generating system that accepts a positive integer number as input and generates a corresponding Hebrew character representation.

13 Claims, 5 Drawing Sheets

METHOD OF GENERATING POSITIVE INTEGER NUMBER IN HEBREW NUMBER SYSTEM

BACKGROUND OF THE INVENTION

A list of rules Is also set up for generating Hebrew character representation of a positive Integer value. However, the presented approach handles neither special treatment of Geresh and Gershayim generation, nor special treatment for number 15 and 16. It only works for numbers not greater than 499.

1. Technical Field

The invention relates generally to numeric formatting software internationalization. More particularly, the invention relates to a method for generating positive integer number in Hebrew number system.

2. Description of the Prior Art

One of the important areas of software internationalization is the translation of numeric values to their textual representation. As described in Richard Gillam's article, spelling out numeric values in words can be useful in many aspects. For instance, spelled-out number values are used on checks and wire-transfer directives because they are harder to counterfeit. In text-to-speech and speech recognition systems, numbers may also need to be spelled out.

Richard Gillam proposed a rule-based approach to solve a more general problem. According to this approach, a list of rules is set up to describe the procedure of number spell-out. Each rule handles a special case of number spell-out by either directly spelling out of a value or by defining a recursive algorithm.

A list of rules is also set up for generating Hebrew character representation of a positive integer value. However, the presented approach handles neither special treatment of Geresh and Gershayim generation, nor special treatment for number 15 and 16. It only only works for numbers not greater than 499.

What is desired is to develop a method that correctly generates the corresponding Hebrew character representation for all positive integer numbers.

SUMMARY OF THE INVENTION

Herein described is an algorithm-based approach, which handles the special treatment of Geresh and Gershayim generation as well as the treatment of number 15 and 16. It also works for all positive integer numbers. The method accomplishes these by performing different steps when the number is not less than 1000, the number is between 100 and 1000 and the number is less than 100.

In a typical embodiment, a web client is provided to input a positive integer number. A web server receives the number and passes the number to a CGI program that implements the method of this invention to generate a corresponding Hebrew character representation for the number. The Hebrew character representation for the number is returned to the web client to be displayed.

DETAILED DESCRIPTION OF THE INVENTION

A. The System Layout

Figure 1:
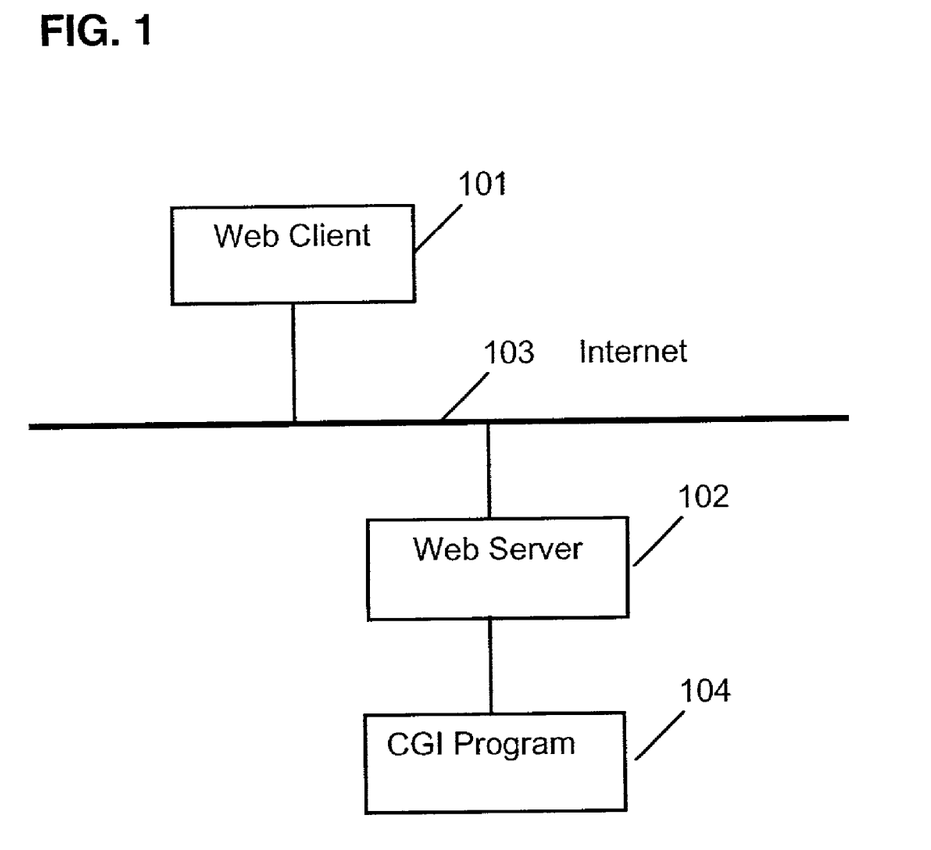
FIG. 1 is a block diagram showing a system layout of a typical embodiment according to this invention.

FIG. 1 is a block diagram that illustrates the system layout of a typical embodiment of current invention, comprising a web client 101 and a web server 102. The web client 101 communicates with the web server 102 through an Internet 103.

The web client 101 inputs a positive integer number to the web server 102. The web server 102 runs a CGI program 104 that implements the method that can generate a corresponding Hebrew character representation of the given number.

B. The Method

Figure 2:
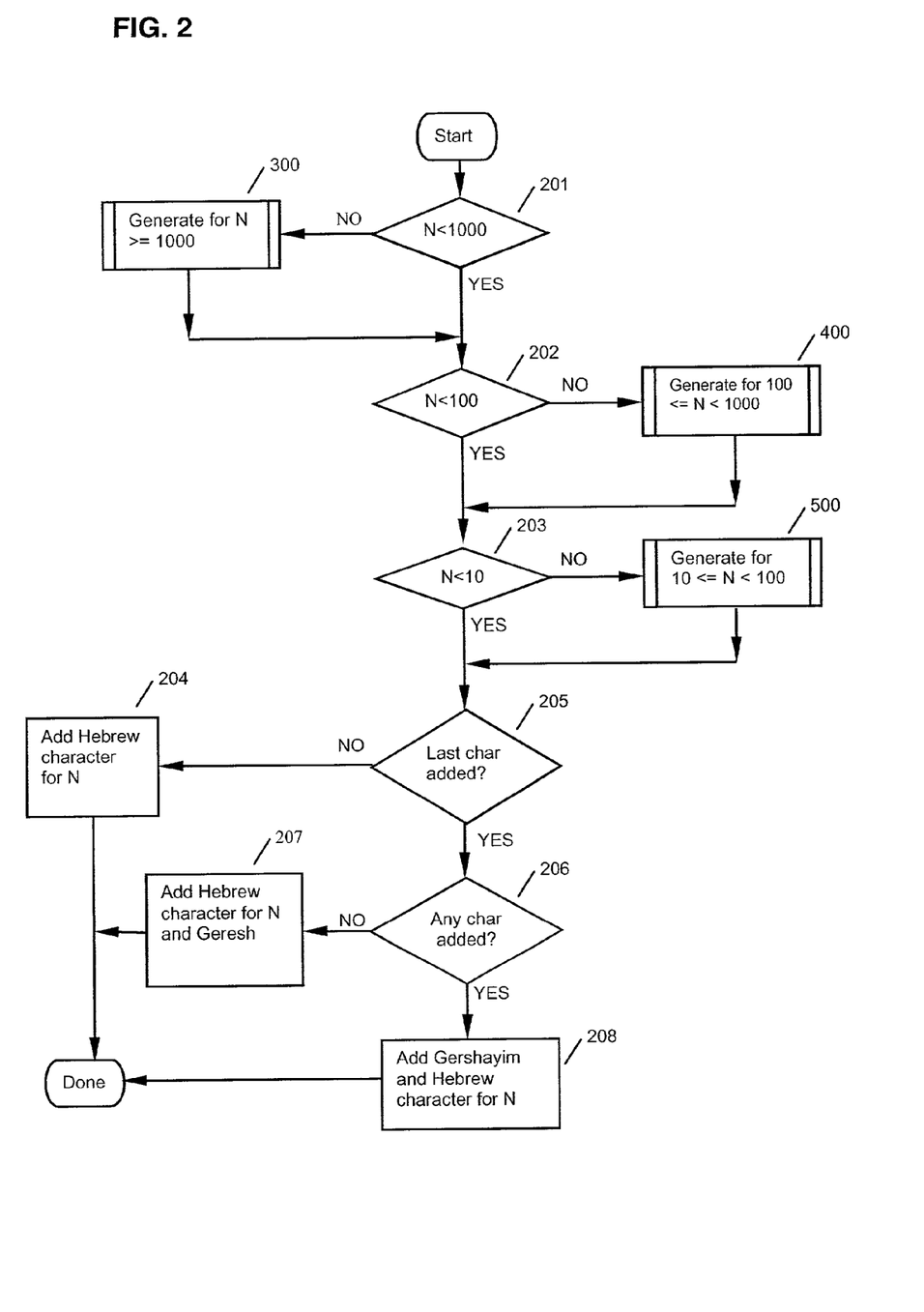
FIG. 2 is a flowchart diagram describing a method for representing any integer number.

FIG. 2 is a flowchart diagram that illustrates a method for generating a corresponding Hebrew character representation for a positive integer number N. The method comprises various steps as follows:

Step 201: Checking whether the given number N is lesser than 1000;

Step 202: If N is lesser than 1000, checking whether N is lesser than 100;

Step 203: If N is lesser than 100, checking whether N is lesser than 10;

Step 204: If N is lesser than 10, adding the Hebrew character for N which is a single digit number.

When adding a Hebrew character for a digit, the following additional steps is performed:

Step 205: Checking whether this is the last character to be added. This is true when N is a single-digit number or N equals any one of the following: 10–90, 100, 200, 300, 400;

Step 204: If this is not the last character to be added, adding the corresponding Hebrew character directly;

Step 206: If this is the last character to be added, checking whether there have been any characters generated already;

Step 207: If there are not characters generated yet, adding the Hebrew character and adding Hebrew character Geresh thereafter;

Step 208: If there are some characters generated already, adding Hebrew character Gershayim before adding the Hebrew character.

Figure 3:
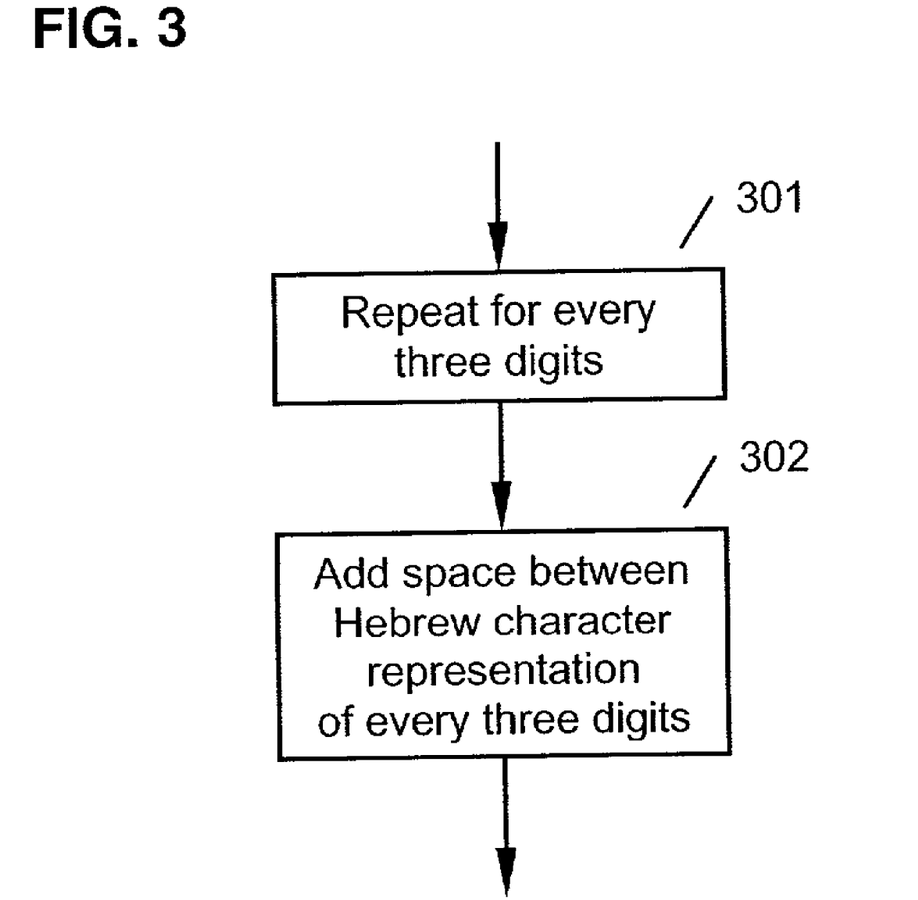
FIG. 3 is a flowchart diagram describing the method for representing integer number not less than 1000.

If Step 201 determines that N is not less than 1000, the method performs step 300 which further comprises the following steps as showing in FIG. 3:

Step 301: Repeating for every three digit of the number.

Step 302: Adding a space character between the corresponding Hebrew character representation of every three digits.

Figure 4:
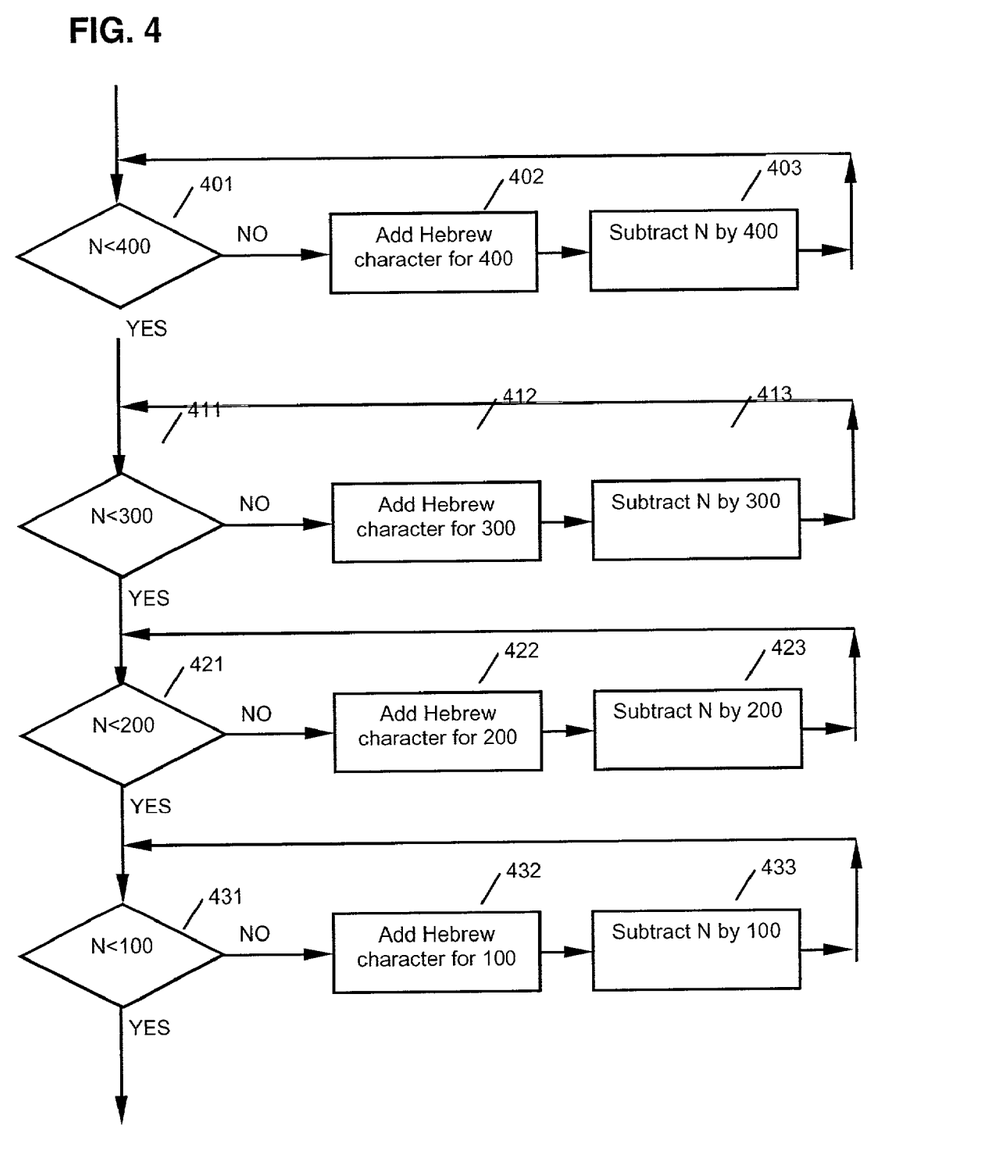
FIG. 4 is a flowchart diagram describing the method for representing integer number not less than 100 and less than 1000.
Figure 5:
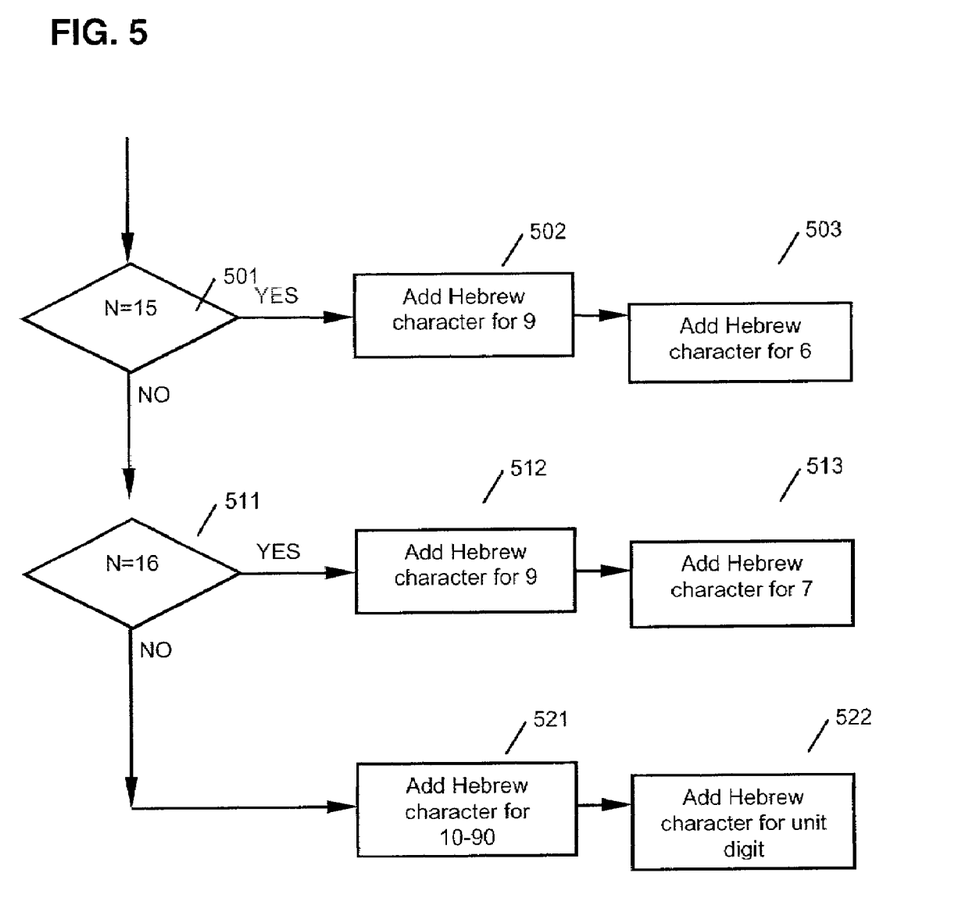
FIG. 5 is a flowchart diagram describing the method for representing integer number not less than 10 and less than 100.

If Step 201 determines that N is less than 1000 but Step 202 determines that N is not less than 100, the method performs step 400 which further comprises the following steps as showing in FIG. 4:

Step 401: Checking where N is less than 400;

Step 402: If N is not less than 400, adding Hebrew character for 400;

Step 403: Subtract 400 from N.
Repeating the Steps 401–403 until N is less than 400.
Then perform the following steps:
  Step 411: Checking whether N is less than 300.
  Step 412: If N is not less than 300, adding Hebrew character for 300;
  Step 413: Subtract 300 from N.
Repeating the Steps 411–413 until N is less than 300.
Then perform the following steps:
  Step 421: Checking whether N is less than 200;
  Step 422: If N is not less than 200, adding Hebrew character for 200;
  Step 423: Subtract 200 from N.
Repeating the Steps 421–423 until N is less than 200.
Then perform the following steps:
  Step 431: Checking whether N is less than 100;
  Step 432: If N is not less than 100, adding Hebrew character for 100;
  Step 433: Subtract 100 from N.
Repeating the Steps 431–433 until N is less than 100.
If Step 202 determines that N is less than 100 but Step 203 determines that N is not less than 10, the method performs step 500 which further comprises the following steps as showing in FIG. 5:

Step 501: Checking whether N is 15;
Step 502: If N is 15, adding Hebrew character for 9. Geresh or Gershayim is not added in this step.
Step 503: Adding Hebrew character for 6.
If N is not 15, the method continues with the following steps:
  Step 511: Checking whether N is 16;
  Step 512: If N is 16, adding Hebrew character for 9. Geresh or Gershayim is not added in this step.
  Step 513: Adding Hebrew character for 7.
If N is not 15 or 16, the method continues the following steps:
  Adding Hebrew character for 10–90 according to the tens digit;
  Adding Hebrew character for the ones digit.

The method or process described above can be carried out by a computer usable medium containing instructions in computer readable form. In other words, the method or process can be incorporated in a computer program, a logic device, E.C., a PLD, ARIC, CR, EPGA, or firmware, and/or can be downloaded from a network, e.g. a Web site over the internet.

C. Code Listing
The following is the C++ code of the algorithm:

```
643
644   #define HEBREW_THROSAND_SEP  0x0020
645   #define HEBREW_GERESH        0x05F3
646   #define HEBREW_GERSHAYIM     0x05F4
647   static PRUnichar gHebrewDigit[22] =
648   {
649   //    1       2       3       4       5       6       7       8       9
650   0x05D0, 0x05D1, 0x05D2, 0x05D3, 0x05D4, 0x05D5, 0x05D6, 0x05D7, 0x05D8,
651   //    10      20      30      40      50      60      70      80      90
652   0x05D9, 0x05DB, 0x05DC, 0x05DE, 0x05E0, 0x05E1, 0x05E2, 0x05E4, 0x05E6,
653   //    100     200     300     400
654   0x05E7, 0x05E8, 0x05E9, 0x05EA
655   };
656
657   static void HebrewToText(PRInt32 ordinal, nsString& result)
658   {
659       PRBool outputSep = PR_FALSE;
660       PRUnichar buf[NUM_BUF_SIZE];
665       PRInt32 idx = NUM_BUF_SIZE;
667       PRUnichar digit;
668       do {
669         PRInt32 n3 = ordinal % 1000;
670         if(outputSep)
674           buf[--idx] = HEBREW_THROSAND_SEP; // output thousand seperator
676         outputSep = ( n3 > 0); // request to output thousand seperator next time.
677
678         PRInt32 d = 0; // we need to keep track of digit got output per 3 digits,
679         // so we can handle Gershayim and Gersh correctly
680
681         // Process digit for 100 – 900
682         for(PRInt32 n1 = 400; n1 > 0; )
683         {
684           if( n3 >= n1)
685           {
686             n3 -= n1;
687
688             digit = gHebrewDigit[(n1/100)-1+18];
689             if( n3 > 0)
690             {
694               buf[--idx] = digit;
696               d++;
697             } else {
698               // if this is the last digit
702               if (d > 0)
703               {
704                 buf[--idx] = HEBREW_GERSHAYIM;
```

-continued

```
705                buf[--idx] = digit;
706            } else {
707                buf[--idx] = digit;
708                buf[--idx] = HEBREW_GERESH;
709            } // if
711        } // if
712    } else {
713        n1 -= 100;
714    } // if
715 } // for
716
717 // Process digit for 10 – 90
718 PRInt32 n2;
719 if( n3 >= 10 )
720 {
721     // Special process for 15 and 16
722     if(( 15 == n3 ) || (16 == n3)) {
723         // Special rule for religious reason...
724         // 15 is represented by 9 and 6, not 10 and 5
725         // 16 is represented by 9 and 7, not 10 and 6
726         n2 = 9;
727         digit = gHebrewDigit[ n2 – 1];
728     } else {
729         n2 = n3 – (n3 % 10);
730         digit = gHebrewDigit[(n2/10)–1+9];
731     } // if
732
733     n3 -= n2;
734
735     if( n3 > 0 ) {
739         buf[--idx] = digit;
741         d++;
742     } else {
743         // if this is the last digit
747         if (d > 0)
748         {
749             buf[--idx] = HEBREW_GERSHAYIM;
750             buf[--idx] = digit;
751         } else {
752             buf[--idx] = digit;
753             buf[--idx] = HEBREW_GERESH;
754         } // if
756     } // if
757 } // if
758
759 // Process digit for 1 – 9
760 if ( n3 > 0 )
761 {
762     digit = gHebrewDigit[n3–1];
763     // must be the last digit
767     if (d > 0)
768     {
769         buf[--idx] = HEBREW_GERSHAYIM;
770         buf[--idx] = digit;
771     } else {
772         buf[--idx] = digit;
773         buf[--idx] = HEBREW_GERESH;
774     } // if
776 } // if
777     ordinal /= 1000;
778 } while (ordinal >= 1);
782 result.Append(buf+idx,NUM_BUF_SIZE-idx);
784 }
785
```

The Following is the Perl version of the algorithm:

```
38    @HEBREWDIGITS= {
39        "OxO5DO ",      # 1      idx 0
40        "OxO5D1 ",      # 2      idx 1
41        "OxO5D2 ",      # 3      idx 2
42        "OxO5D3 ",      # 4      idx 3
43        "OxO5D4 ",      # 5      idx 4
```

-continued

```
44          "OxO5D5 ",    # 6      idx 5
45          "OxO5D6 ",    # 7      idx 6
46          "OxO5D7 ",    # 8      idx 7
47          "OxO5D8 ",    # 9      idx 8
48          "OxO5D9 ",    # 10     idx 9
49          "OxO5DB ",    # 20     idx 10
50          "OxO5DC ",    # 30     idx 11
51          "OxO5DE ",    # 40     idx 12
52          "OxO5EO ",    # 50     idx 13
53          "OxO5E1 ",    # 60     idx 14
54          "OxO5E2 ",    # 70     idx 15
55          "OxO5E4 ",    # 80     idx 16
56          "OxOSE6 ",    # 90     idx 17
57          "OxO5E7 ",    # 100    idx 18
58          "OxO5E8 ",    # 200    idx 19
59          "OxO5E9 ",    # 300    idx 20
60          "OxO5EA ",    # 400    idx 21
61      );
62      $space = "OxO020 ";
63      $geresh = "OxO5F3 ";
64      $gershayim= "OxO5F4";
65      %TR= {
66          "Ox05DO", "Alef",
67          "Ox05D1", "Bet",
68          "OxO5D2", "Gimel",
69          "OxO5D3", "Dalet",
70          "Ox05D4", "He",
71          "Ox05D5", "Vav",
72          "OxO5D6", "Zayin",
73          "OxO5D7", "Het",
74          "OxO5D8", "Tet",
75          "OxO5D9", "Yod",
76          "Ox05DB", "Kaf",
77          "Ox05DC", "Lamed",
78          "Ox05DE", "Mem",
79          "Ox05EO", "Nun",
80          "OxO5E1", "Samekh",
81          "OxO5E2", "Ayin",
82          "OxO5E4", "Pe",
83          "OxO5E6", "Tsadi",
84          "Ox05E7", "Qof",
85          "Ox05E8", "Resh",
86          "OxO5E9", "Shin",
87          "Ox05EA", "Tav",
88          "OxOO20", "[SPACE]",
89          "OxO5F3", "Geresh",
90          "OxO5F4", "Gershayim",
91      };
92      sub numtohebrew
93      {
94          local($Y) = @_;
95          if($y < 10 )
96          {
97              $ki = $y − 1;
98          } elsif ($y < 100 )
99          {
100             $ki = ($Y/10) − 1 + 9;
101         } else {
102             $ki = ($y/100) − 1 + 18;
103         }
104         return $HEBREWDIGITS[$ki];
105     }
106     sub printhebrewNum
107     {
108         local($n) = @_;
109         $num = $n;
110
111         $total = "";
112         $thu = 0;
113         do {          # process three digits a tirne
114             $cur= "";    #        text for that three digits
115             if ($thu {=1)
116             {
117                 $total = $space . $total;
118             }
119             $thu = $thu + 1;
120             $n3 = $n % 1000;
121             $d = 0;           # number of chars used in these three digits
122             # look at 400, 300, 200, and 100 (Tav, Shin, Resh, Qof)
```

```
-continued
123       for ( $i = 400; $i >= 100; )
124       {
125          if( $n3 >= $i)
126          {
127             $n3 -= $i;
128             if ((0 eq $n3) && ($d > 0))
129             {
130                $cur = $cur . $gershayim; $d += 1;
131             }
132             $cur = $cur . $numtohebrew($i); $d += 1;
133          } else {
134             $i -= 100;
135          }
136       }
137       # look at 10 - 90
138       if($n3 >= 10)
139       {
140          # special process for 15 and 16
141          if(($n3 eq 15) || ($n3 eq 16))
142          {
143             $n2 = 9;
144          } else {
145             $n2 = $n3 - ($n3 %10);      # $n2 = 10, 20, 30...90
146          }
147
148          $n3 = $n3 - $n2;
149          if(( 0 eq $n3 ) && ($d > 0))
150          {
151             $cur = $cur . $qershayim; $d += 1;
152          }
153          $cur = $cur . $numtohebrew($n2); $d += 1;
154          If (($n3 eq 0) && ($d eq 1)) # if we only use 1 digit, output
                 Geresh
155          {
156             $cur .= $geresh; $d += 1;
157          }
158       }
159       if($n3 > 0)
160       {
161          if($d > 0)                           # output Gershayim
162          {
163             $cur = $cur . $qershayim; $d += 1;
164          }
165          $cur = $cur . $numtohebrew($n3); $d += 1;
166       }
167       if($d eq 1)                        # if we only use 1 digit, output
                 Geresh
168       {
169          $cur . = $geresh; $d += 1;
170       }
171
172       $total = $cur . $total;
173       $n /= 1000;
174    } while ( $n >= 1);
175    return $total;
176 }
```

D. Interaction

In one example, the web server 102 provides the web client 101 with a web page that can input a positive integer number. When the web client 101 submits the input number to the web server 102 through the Internet 103, the web server 102 invokes the CGI program 104 which implements the method of this invention to generate the corresponding Hebrew character representation for the number. The Hebrew character representation for the number is returned for the input number.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. A computer implemented method for generating a corresponding Hebrew character representation for a positive integer number implemented using computer readable instructions, comprising the steps of:
   (a) checking whether said number is less than 1000;
   (b) if said number is less than 1000, checking whether said number is less than 100;
   (c) if said number is less than 100, checking whether said number is less than 10;
   (d) if said number is less than 10, adding Hebrew character for said number;
   (e) for each digit being added that is possible to be the last character, checking whether it is the last character to be added;
   (f) if it is the last character to be added, checking whether there are any characters added;

(g) if there are no characters added yet, adding Hebrew character Gershayim before adding character; and (h) if there are characters already added, adding Hebrew character Geresh after adding said character.

2. The method of claim 1, wherein said number is not less than 1000 determined by step (a), further comprising the steps of:

(i) repeating steps (b)–(h) for every 3 digits; and (j) adding a space between said generated Hebrew character representation for every three digits.

3. The method of claim 1, wherein said number is not less than 100 and less than 1000 determined by step (b), further comprising the steps of:

(k) repeatedly subtracting 400 and adding Hebrew character for 400 until the number is less than 400;

(l) repeatedly subtracting 300 and adding Hebrew character for 300 until the number is less than 300;

(m) repeatedly subtracting 200 and adding Hebrew character for 200 until the number is less than 200; and (n) repeatedly subtracting 100 and adding Hebrew character for 100 until the number is less than 100.

4. The method of claim 1, wherein said number is not less than 10 and less than 100 determined by step (c), if said number is 15, further comprising the steps of:

(o) adding Hebrew character for 9; and (p) adding Hebrew character for 6.

5. The method of claim 1, wherein said number is not less than 10 and less than 100 determined by step (c), if said number is 16, further comprising the steps of:

(q) adding Hebrew character for 9; and (r) adding Hebrew character for 7.

6. The method of claim 1, wherein said number is not less than 10 and less than 100 determined by step (c), if said number is not 15 or 16, further comprising the steps of:

(s) adding a Hebrew character for 10–90 by the tens digit of said number; and (t) adding Hebrew character for the ones digit of said number.

7. A computer usable medium containing instructions in computer readable form for carrying out a process for generating a corresponding Hebrew character representation for a positive integer number, wherein said process comprises the steps of:

(a) checking whether said number is less than 1000;

(b) if said number is less than 1000, checking whether said number is less than 100;

(c) if said number is less than 100, checking whether said number is less than 10;

(d) if said number is less than 10, adding Hebrew character for said number;

(e) for each digit being added that is possible to be the last character, checking whether it is the last character to be added;

(f) if it is the last character to be added, checking whether there are any characters added;

(g) if there are no characters added yet, adding Hebrew character Gershayim before adding character; and (h) if there are characters already added, adding Hebrew character Geresh after adding said character.

8. The computer usable medium of claim 7, wherein when said number is not less than 1000 determined by step (a), said process further comprises the steps of:

(i) repeating steps (b)–(h) for every 3 digits; and (j) adding a space between said generated Hebrew character representation for every three digits.

9. The computer usable medium of claim 7, wherein when said number is not less than 100 and less than 1000 determined by step (b), said process further comprises the steps of, (k) repeatedly subtracting 400 and adding Hebrew character for 400 until the number is less than 400;

(l) repeatedly subtracting 300 and adding Hebrew character for 300 until the number is less than 300;

(m) repeatedly subtracting 200 and adding Hebrew character for 200 until the number is less than 200; and (n) repeatedly subtracting 100 and adding Hebrew character for 100 until the number is less than 100.

10. The computer usable medium of claim 7, wherein when said number is not less than 10 and less than 100 determined by step (c), if said number is 15, then said process further comprises the steps of:

(o) adding Hebrew character for 9; and (p) adding Hebrew character for 6.

11. The computer usable medium of claim 7, wherein when said number is not less than 10 and less than 100 determined by step (c), if said number is 16, then said process further comprises the steps of:

(q) adding Hebrew character for 9; and (r) adding Hebrew character for 7.

12. The computer usable medium of claim 7, wherein when said number is not less than 10 and less than 100 determined by step (c), if said number is not 15 or 16, then said process further comprises the steps of:

(s) adding a Hebrew character for 10–90 by the tens digit of said number; and (t) adding Hebrew character for the ones digit of said number.

13. The computer usable medium of claim 7, wherein said instructions in a computer readable form may be downloaded from a website over the Internet.

* * * * *